United States Patent
Kulchytskyy et al.

(10) Patent No.: US 10,452,386 B1
(45) Date of Patent: Oct. 22, 2019

(54) NON-DESTRUCTIVE UPDATE OF DISCRETE COMPONENTS OF FIRMWARE

(71) Applicant: American Megatrends, Inc., Norcross, GA (US)

(72) Inventors: Igor Kulchytskyy, Norcross, GA (US); Senthamizhsey Subramanian, Suwanee, GA (US); Bejean David Mosher, Acworth, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 16/039,667

(22) Filed: Jul. 19, 2018

(51) Int. Cl.
- *G06F 8/654* (2018.01)
- *G06F 8/65* (2018.01)
- *G06F 9/4401* (2018.01)
- *G06F 16/245* (2019.01)

(52) U.S. Cl.
CPC .............. *G06F 8/654* (2018.02); *G06F 8/65* (2013.01); *G06F 9/4401* (2013.01); *G06F 16/245* (2019.01)

(58) Field of Classification Search
CPC ....................................................... G06F 8/65
USPC ....................................................... 717/169
See application file for complete search history.

(56) References Cited

U.S. PATENT DOCUMENTS

| | | | | |
|---|---|---|---|---|
| 8,543,998 B2 * | 9/2013 | Barringer | ............ | G06F 11/3664 717/169 |
| 8,707,297 B2 * | 4/2014 | Brown | ................... | G06F 8/65 717/178 |
| 9,298,371 B1 * | 3/2016 | Selvam | ................ | G06F 3/0607 |
| 10,127,032 B2 * | 11/2018 | Su | ............................. | G06F 8/66 |
| 2012/0084552 A1 * | 4/2012 | Sakthikumar | ......... | G06F 21/572 713/100 |
| 2013/0125107 A1 * | 5/2013 | Bandakka | ........... | G06F 11/1417 717/171 |

(Continued)

OTHER PUBLICATIONS

"JSON Format (OData Version 2.0)"; OData.org website [full url in ref.], as captured by the Wayback Machine Internet Archive (archive.org) on Sep. 28, 2017 (Year: 2017).*

(Continued)

*Primary Examiner* — Qing Chen
*Assistant Examiner* — Clint Thatcher
(74) *Attorney, Agent, or Firm* — Newport IP, LLC Shigeta | Hope

(57) ABSTRACT

Non-destructive update of discrete firmware components of a firmware is provided. During a boot-up process, the availability of an update for the firmware can be determined prior to execution thereof. To that end, a controller device can be queried for availability of the update and, when the update is available, a processor that executes the firmware as part of the boot-up process can retrieve an updated version of one or more components of the firmware from a virtual drive device provided by the controller device. The processor can retain such component(s) in a main memory device. The processor can then execute the component(s) from the main memory and can execute other non-updated component(s) of the firmware from a non-volatile memory device that retains the firmware. Therefore, the firmware can be updated during the boot-up process, without changing the contents of the non-volatile memory device.

19 Claims, 6 Drawing Sheets

(56) References Cited

U.S. PATENT DOCUMENTS

| | | | | |
|---|---|---|---|---|
| 2014/0122851 A1* | 5/2014 | Guo | ............................ | G06F 8/65 |
| | | | | 713/1 |
| 2014/0317612 A1* | 10/2014 | Ayanam | .............. | G06F 11/1433 |
| | | | | 717/171 |
| 2016/0291958 A1* | 10/2016 | Riedisser | ................... | G06F 8/65 |
| 2016/0306616 A1* | 10/2016 | Tomppo | ..................... | G06F 8/65 |
| 2018/0004952 A1* | 1/2018 | Samuel | ................. | G06F 21/575 |
| 2018/0173516 A1* | 6/2018 | Tung | ........................ | G06F 8/654 |
| 2018/0314511 A1* | 11/2018 | Butcher | ..................... | G06F 8/65 |

OTHER PUBLICATIONS

Caleb Lloyd; "Introducing fixuid: Tool for Changing Docker Container UID/GID at Runtime"; BoxBoat.com Blog page [full url in ref.]; Jul. 25, 2017 (Year: 2017).*

* cited by examiner

NON-DESTRUCTIVE UPDATE OF DISCRETE COMPONENTS OF FIRMWARE

BACKGROUND

Firmware utilized by many computer systems to boot up is often stored on a non-volatile memory device. Therefore, an update of the firmware or firmware components typically involves changing the content of the non-volatile memory device. Although specialized utilities are available to perform such changes, some updates may be needed after build time, when a computer system is first built and configured, such as by a system manufacturer. Thus, changes to the content of the non-volatile memory device might be unfeasible or far from straightforward. Further, the non-volatile memory device on which the firmware is stored may, in some cases, be erasable only in blocks, or otherwise predetermined segments of memory space. As a result, erasing and rewriting components of a firmware may entail erasing a section of memory that is greater in size than that of the firmware component(s) that are to be updated.

Other complications may arise as a result of failing to correctly update a firmware component, such as rendering the computer system inoperable and/or unrecoverable. Recovering from an inoperable state may entail restoring the entirety of the firmware which, in some cases, may require a field and/or service technician. Therefore, much remains to be improved in conventional technologies to update firmware.

SUMMARY

The disclosure recognizes and addresses, in at least some embodiments, the issue of updating firmware of a computing system. The computing system can include an embedded system, a wireless system, a cloud computing system, a data center system, a combination of the foregoing, or the like. More specifically, yet not exclusively, the disclosure provides computing systems, computing devices, computer-implemented techniques, and computing program products to update discrete firmware components of a firmware.

A discrete firmware component in accordance with this disclosure can be embodied in or can include a defined group of machine-accessible instructions (e.g., computer-readable instructions and/or computer-executable instructions) and/or machine-readable data configured to be executed by a processor in order to cause the processor to provide firmware functionality. While embodiments of the disclosure are illustrated in connection with firmware file system (FFS) files, the disclosure is not so limited and other types of firmware components can be contemplated. More specifically, the principles of this disclosure can be applied to any discrete portion of the firmware that is individually replaceable and executable, and also is uniquely identifiable within the scope of a software system that includes the firmware. Such a discrete portion includes a defined group of machine-accessible instructions and/or machine-readable data configured to be executed by a processor in order to cause the processor to provide a particular firmware functionality.

FFS files can be embodied in or can include one or more extensible firmware interface (EFI) drivers and/or one or more EFI applications. Regardless of the particular type of firmware component, the update disclosed herein leverages a baseboard management controller (BMC) that forms part of a side-band structure of the computing system for managing aspects of the operation of a computing system. The BMC can be embodied in a specialized service processor that can monitor the physical state of a computer, network server, or other hardware device using sensors, and can communicate with a system administrator device by means of an out-of-band (OOB) network connection. The update in accordance with this disclosure can be, therefore, non-destructive in that the update can avoid reconfiguration of a non-volatile memory device that contains the firmware.

During a boot-up process, processor(s) that execute the firmware can determine availability of an update for the firmware prior to execution thereof. To that end, the processor(s) can query the BMC for availability of the update using a hypermedia representational state transfer (REST) interface where data is expressed using a JavaScript object notation (JSON) format based on open data protocol (OData). OData is a protocol that permits the creation and consumption of REST application programming interfaces (APIs), which allow web clients to publish and edit resources using simple hypertext transfer protocol (HTTP) messages. The resources are identified using uniform resource locators (URLs) and are defined in a data model. Therefore, OData permits querying and updating data using core protocols (such as HTTP) and RESTful interfaces. OData includes services, and various libraries and tools are available to consume such services. In addition, OData permits or otherwise facilitates interoperability between disparate data sources, applications, services, and clients. OData is standardized at the Organization for the Advancement of Structured Information Standards (OASIS), and the standard is currently approved by the International Organization for Standardization (ISO) and the International Electrotechnical Commission (IEC).

In a scenario in which the update for the firmware is available, the processor(s) can retrieve one or more updated versions of respective discrete components of the firmware from a virtual drive device and/or by means of a virtual media service provided by the BMC. The processor(s) can retain the one or more updated versions of the discrete components of the firmware in a storage device, such as a main memory device. An extant version of the updated version of a firmware component that is stored in the non-volatile memory device is not executed. Instead, the processor(s) execute the updated version of the firmware component from the storage device. Thus, by executing the updated version of the firmware component, the firmware is updated during the boot-up process, without physical reconfiguration or other types of changes to the contents of the non-volatile memory device. Information indicative or otherwise representative of availability of an update of a firmware component can be retained at the BMC. At least a portion of such information can be configured remotely using the hypermedia RESTful interface utilized to assess availability of an update.

Embodiments of the disclosure provide several technical benefits. For example, updates to firmware components can be configured without disrupting the operation of a hosting computing device, which permit implementing an update at a suitable time for booting up the managed computing system to be updated. As another example, an updated firmware component can be executed regardless of the size of the memory available on the non-volatile memory that retains the firmware to be updated. Therefore, firmware functionality can be expanded ad hoc, without prior allocation of non-volatile memory space for such expansions. It is noted, however, that random access memory (RAM) device available to the hosting computing device might determine the size of the updated firmware component that can be executed. At least the foregoing technical benefits can provide superior flexibility and/or efficiency relative to conventional technologies to update firmware. These and other technical benefits can be realized through an implementation of the disclosed technologies.

This Summary is provided to introduce a selection of the technologies disclosed herein in a simplified form that are described in greater detail below in the Detailed Description. This Summary is not intended to identify key elements or essential elements of the claimed subject matter, nor is it intended that this Summary be used to limit the scope of the claimed subject matter. Furthermore, the claimed subject matter is not limited to embodiments or implementations thereof that solve any or all disadvantages noted in any part of this disclosure.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows:

DETAILED DESCRIPTION

As mentioned, the disclosure recognizes and addresses, in at least some embodiments, the issue of updating firmware of a managed computing system. More specifically, the disclosure permits non-destructive updates of discrete firmware components of the managed computing system. As is described in greater detail below, embodiments of the disclosure utilize or otherwise leverage a BMC (or, in some instances, other types of controller devices) and a RESTful interface to administer update(s) to a firmware. As such, the updates can be implemented without changes to hardware that contains the firmware. In addition, the updates can be deployed automatically across computing platforms having a size ranging from a single host computing device to thousands of host computing devices, for example, as it can be the case in some data centers and/or cloud computing platforms.

The subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Aspects and/or elements of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, wearable devices, special-purpose hardware devices, network appliances, and the like.

The configurations described herein can be practiced in distributed computing environments, where tasks can be performed by remote computing devices that are linked or otherwise communicatively coupled via a communications network. In a distributed computing environment, program modules can be located in both local and remote memory storage devices.

Figure 1:
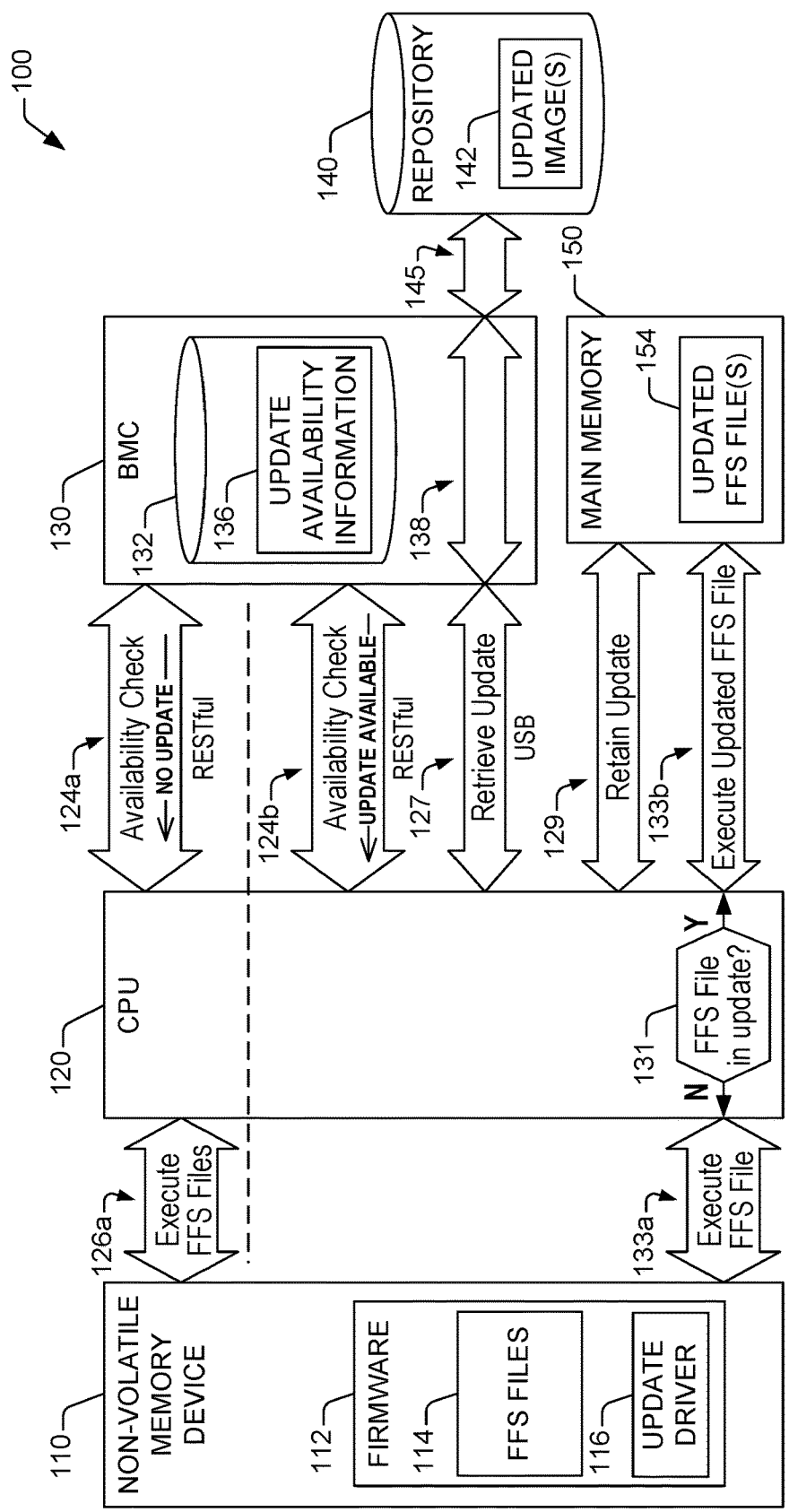
FIG. 1 illustrates an example of a computing architecture for non-destructive update of a firmware component in accordance with one or more embodiments of the disclosure.

With reference to the drawings, FIG. 1 illustrates an example of a computing architecture 100 for a non-destructive update of a firmware component in accordance with one or more embodiments of the disclosure. The exemplified computing architecture 100 includes a non-volatile memory device 110 (e.g., a flash memory device) having encoded thereon firmware 112. The firmware 112 includes device-accessible instructions (e.g., computer-readable instruction and/or computer-executable instructions) and device-readable data configured to be executed by one or more processors in order to cause the processor(s) to provide firmware functionality.

In some embodiments, the firmware 112 can be implemented to be compliant with the UEFI Specification. More specifically, in some embodiments, the firmware 112 can include FFS files 114. The FFS files 114 can be original FFS files, as initially configured when providing the firmware 112 on the non-volatile memory device 110 during build-time of the computing architecture 100. The FFS files 114 can be configured or otherwise arranged in one or more firmware volumes (FVs; not depicted). The FFS files can include, for example, one or more hardware drivers and/or one or more virtual hardware drivers.

While FFS files are illustrated, the firmware 112 can include other types of firmware components. Other types of firmware can be utilized in other embodiments. Additional details regarding the configuration and operation of the firmware 112 in one embodiment are provided herein with respective to FIG. 5.

The firmware 112 also can include an update driver 116 that can permit or otherwise facilitate implementing one or more updates of FFS files or, as mentioned, other types of discrete firmware components. To that end, the exemplified computer architecture 100 includes a central processing unit (CPU) 120 that is functionally coupled to the non-volatile memory device 110 and can include one or more processors, each having at least one processing core. The one or more processors can be assembled in one or more computing chipsets.

The CPU 120 can execute the firmware 112. In order to execute an up-to-date version of the firmware 112, the CPU 120 can execute the update driver 116 to determine the availability of an update for the firmware 112. To implement such a determination, amongst other functionality, the exemplified computer architecture 100 includes a BMC 130 functionally coupled to the CPU 120. The BMC 130 constitutes a side-band structure and can be functionally coupled to the CPU 120 via, for example, a peripheral component interconnect express (PCIe) bus and/or a universal serial bus (USB). The BMC 130 can be embodied in or can include a specialized service processor (e.g., a microcontroller) that can utilize or otherwise leverage sensors to monitor the physical state of a computer, network server, or another type of hardware device. The BMC 130 also can communicate with a system administrator device by means of an 00B network connection.

More specifically, the BMC 130 can monitor health-related aspects associated with a host computing device that includes the CPU 120 and the non-volatile memory device 110. For instance, the BMC 130 can monitor the temperature of one or more components of the host computing device; speed of rotational components (e.g., spindle motor, CPU fan, etc.) within the host computing device; the voltage across or applied to one or more components within the host computing device; the available and/or used capacity of memory devices within the host computing device; a combination of the foregoing or the like. To accomplish such monitoring functions, in some embodiments, the BMC 130 can be communicatively coupled to one or more components of the host computing device. For example, as is illustrated in FIG. 1, the BMC 130 can be functionally coupled to the CPU 120 and the non-volatile memory device 110.

As such, the CPU 120 can leverage the BMC 130 to determine availability of an update for the firmware 112. More specifically, the CPU 120 can send a query message as part of an availability check process 124*a* to determine the availability of an update for a group of FFS files associated with the firmware 112. The group of FFS files can include one FFS file or multiple FFS files. The query message can be sent, for example, using a hypermedia REST interface implemented as a REDFISH-compatible interface. REDFISH is a successor to previous manageability interfaces created by the Distributed Management Task Force (DMTF). REDFISH is an open industry standard specification and schema for simple, modern, and secure management of scalable platform hardware, such as server computers located in data centers, cloud computing environments, or the like. The REDFISH specification and schema specifies a REST interface and utilizes JSON and OData to integrate management solutions within existing toolchains, for example.

Thus, in one aspect, data included in the message can be expressed using a JSON format based on OData. Such a hypermedia REST interface (represented with a "RESTful" label in FIG. 1) is not limited to being a REDFISH-compatible interface.

The BMC 130 can receive the query message and can determine, for example, that an update for the firmware 112 is unavailable. In one embodiment, the BMC 130 can determine respective values of one or more records representative of the availability of an update for a group of FFS files. In one embodiment, a single record can be representative of the availability of an update for the group of FFS files. For instance, the record can have a first value representative or otherwise indicative of the update being available. In addition, the record can have a second value representative or otherwise indicative of the update being unavailable. The one or more records can be retained in a memory device 132, within one or more defined data structures 136 (represented as update availability information 136).

In the absence of an update for the firmware 112—e.g., at least one of such record(s) being indicative of the absence of such an update—, the BMC 130 ascertains that the update for the firmware 112 is unavailable. In response, the BMC 130 sends a message indicative of the absence of the update to the CPU 120. Such a message is represented in FIG. 1 with an arrow labeled "No Update." Such a message also can be sent, for example, using the hypermedia REST interface implemented as a REDFISH-compatible interface. As such, in one aspect, the data included in the No Update message can be expressed using a JSON format based on OData.

Upon or after receiving the message indicative of the absence of an update for the firmware 112, the CPU 120 can execute the FFS files 114 of the firmware 112. The FFS files 114 can be executed from the non-volatile memory device 110 in a process 126*a*, as part of the boot-up process of the computing system that includes the firmware 112. To that end, the CPU 120 can identify an FFS file of the FFS files 114, execute the FFS file, and determine if the boot-up process is complete upon or after the execution of the FFS file. In one aspect, to identify the FFS file, the CPU 120 can determine or otherwise obtain a unique identifier of the FFS file. The unique identifier can be embodied in or can include a GUID, a file name of the first FFS file, a combination thereof, or the like. The boot-up process ends in response to a positive determination. In the alternative, the boot-up process can continue with the identification and execution of another FFS file in response to a determination that the boot-up process is not complete.

In other scenarios, the CPU 120 can send another query message as part of an availability check process 124*b* to determine the availability of an update for a group of FFS files associated with the firmware 112. The query message can be sent, for example, using a hypermedia REST interface implemented as a REDFISH-compatible interface. Thus, data included in the message can be expressed using a JSON format based on OData. Such a hypermedia REST interface (also represented with a "RESTful" label in FIG. 1) is not limited to being a REDFISH-compatible interface.

In an instance, an update for the firmware 112 is available—e.g., at least one of the record(s) representative of availability of the update having respective values indicative of the presence of such an update. In response to ascertaining that an update for the firmware 112 is present, the BMC 130 makes available the update for a group of FFS files to the CPU 120. To that end, in one embodiment, the BMC 130 can configure a virtual drive device (e.g., a USB virtual drive) by mounting a group of one or more updated images 142. Such a group corresponds to the group of FFS files. A process 138 represents the virtualization of the group of one or more update images 142 by the BMC 130.

The virtual drive device can be configured according to a defined storage protocol. For instance, in an embodiment in which the BMC 130 provides USB functionality—e.g., the BMC 130 includes a USB controller component and can send and/or receive information according to the USB protocol—the BMC 130 can create a virtual USB drive device. Therefore, in one aspect, the BMC 130 can provide at least a portion of information representative or otherwise indicative of an update image by means of a USB interface (represented with a label "USB" in FIG. 1). In addition, or in other embodiments, the BMC 130 can provide a service that exposes the group of one or more updated images 142 to the CPU 120, via defined methods and properties. As is illustrated in FIG. 1, the group of one or more updated images 142 can be retained in one or more memory devices 140 (collectively referred to as a repository 140). The repository 140 can be embodied in or can included one or more mass storage devices. The repository 140 can be functionally coupled to the BMC 130 via network elements 145 of one or more networks. The network elements 145 can include wireless elements and/or non-wireless elements, such as gateway devices, switch devices, network adapters, access point devices, wireline links, wireless links, a combination thereof, or the like.

The BMC 130 also sends a message indicative of the presence of the update to the CPU 120—the message represented in FIG. 1 with an arrow labeled "Update Available"—in response to ascertaining that an update for the firmware is available. In some embodiments, such a message can indicate the presence of the update for a group of FFS files by including an update instruction to retrieve such an update (e.g., one or more new executable images that constitute the group of FFS files) either from the virtual drive or by means of the service provided by the BMC 130. The message can be sent, for example, using a hypermedia REST interface and can include instruction data representative of such an instruction.

The hypermedia REST interface (represented with a "RESTful" label in FIG. 1) can be implemented as a REDFISH-compatible interface. Thus, in one aspect, the instruction data included in the Update Available message can be expressed using a JSON format based on OData. The instruction data can be configured, for example, as non-standard data within a standard property, where the non-standard data can include a data path or another type of location (e.g., a virtual memory address) of the update for the group of FFS files. In some embodiments, the standard property can be a REDFISH property.

It is noted that the order in which the BMC 130 makes available the group of one or more updated images 142 and sends the Update Available message is not limited to the foregoing order. In some instances, depending on the architecture of the BMC 130, the BMC 130 can make available the group of one or more updated images 142 nearly concurrently with the submission of the Update Available message.

Execution of the update driver 116 by the CPU 120 can cause the CPU 120 to receive the message indicative of an update for firmware 112 being available. Therefore, The CPU 120 can receive the update instruction to retrieve the update for the group of FFS files. In response, the CPU 120 can retrieve the one or more new executable images that constitute the group of FFS files. To that point, the CPU 120 can execute the update driver 116 to implement a fetch process 127, for example, to retrieve the executable image(s) either from the virtual drive or by means of the service provided by the BMC 130.

Execution of the update driver 116 also can cause the CPU 120 to retain the update for the group of FFS files. As is illustrated in FIG. 1, the update can be retained in one or more main memory devices, collectively referred to as main memory 150. Specifically, the one or more new executable images that constitute the group of FFS files can be retained in respective updated FFS file(s) 154.

Upon or after the new executable image(s) are retained within respective updated FFS file(s) 154, the CPU 120 can execute or continue executing the update driver 116 to identify a FFS file from the FFS files 114 to execute as part of a boot-up process of a computing system that includes the firmware 112. To that end, the CPU 120 can determine or otherwise obtain a unique identifier of the FFS file. The unique identifier can be embodied in or can include a globally unique identifier (GUID), a file name of the first FFS file, a combination thereof, or the like. In some embodiments, the CPU 120 can identify an image of a hardware driver or an image of a virtual hardware driver, determining an appropriate unique identifier regardless of the type of image that is identified.

In addition, execution of the update driver 116 can cause the CPU 120 to determine, as part of the operation 131, if the identified FFS file corresponds to a first FFS file included in the updated FFS file(s) 154. To that end, in one example, the CPU 120 can determine if a match exists between a GUID of the identified FFS file and another GUID associated with an FFS file included in the group of FFS files. A negative determination (e.g., it is determined that such a match does not exist) can cause the CPU 120 to execute the FFS file from the non-volatile memory device 110, as part of a process 133*a*. In the alternative, a positive determination (e.g., it is determined that the match does exist) can cause the CPU 120 to execute an updated version of the identified FFS file from the main memory 150, as part of a process 133*b*. Therefore, execution of the updated version of the identified FFS file can result, at least in part, in a boot-up process that corresponds to a current or otherwise updated version of the firmware 112, without reliance on updating the contents of the non-volatile memory device 110 as is typically the case in conventional technologies.

The CPU 120 can determine if the boot-up process is complete upon or after either one of the execution of the FFS file from the non-volatile memory 110 or the execution of the updated version of the FFS file from the main memory 150. The boot-up process ends in response to a positive determination. In the alternative, in response to a determination that the boot-up process is not complete, the boot-up process continues by identifying another FFS file from the FFS files 114; determining if the other FFS file is included in the updated FFS file(s) 154; and either executing an extant version of the FFS file from the non-volatile memory 110 or executing an updated version of the FFS file from the main memory 150; and further determining if the boot-up process is complete. The foregoing iterations continue until the entirety of the FFS files 114 are traversed.

The BMC 130 can have components—e.g., hardware component(s), software component(s), or a combination thereof—that can permit or otherwise facilitate operating in accordance with this disclosure. As is illustrated in the computing architecture 200 shown in FIG. 2, in some embodiments, the BMC 130 can execute a management server 210 that, in response to execution, causes the BMC 130 to perform the functionality described herein for a non-destructive update of a discrete firmware component.

Figure 2:
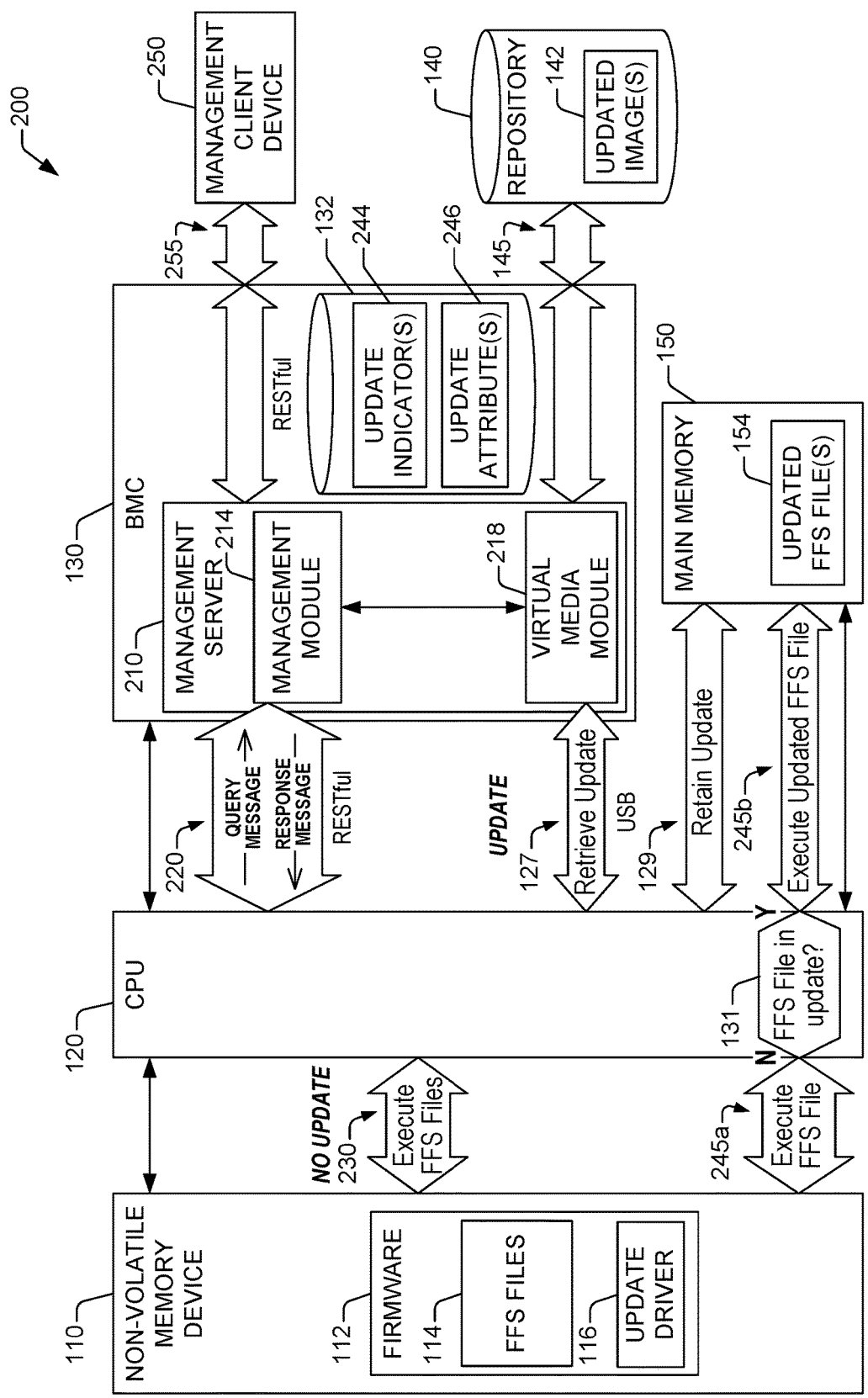
FIG. 2 illustrates another example of a computing architecture for non-destructive update of a firmware component in accordance with one or more embodiments of the disclosure.

While not depicted in FIG. 2, the BMC 130 can include one or more processors that can execute the management server 210. In one embodiment, the management server 210 can include a management module 214. The BMC 130 can execute the management module 214 in order to receive a query message as part of a process 220 to determine availability of an update for the firmware 112. The update can include one or more new versions of FFS files or other types of firmware components (e.g., a FFS file, such as an EFI driver or an EFI application) associated with the firmware 112.

As disclosed herein, the CPU 120 can send the query message in response to the execution of an update driver 116, as part of a boot-up process. The query message can be sent using a hypermedia REST interface, where the CPU 120 can send data representative of the query message using the hypermedia REST interface. The CPU 120 can configure the data according to a JSON format based on OData. Such a RESTful interface can be implemented as a REDFISH-compatible interface.

The BMC 130 can receive the query message and, in response, the BMC 130 can execute (or, in some embodiments, can continue executing) the management module 214 to determine the availability of an update for the firmware 112 (e.g., update available or update unavailable). One or more records indicative or otherwise representative of availability of the update can be retained in one or more data structures 244 (referred to as update indicator(s) 244). Such records can form part of the update availability information 136 disclosed herein.

In some scenarios, the BMC 130 determines that at least one of such record(s) has a value indicative of absence of an update for a group of FFS files or other types of firmware components associated with the firmware 112. As disclosed herein, the group of FFS files or other types of firmware components can include, for example, an EFI driver or an EFI application, and can constitute the update for the firmware 112. Therefore, the BMC 130 ascertains that an update for the firmware component is unavailable. In response, the BMC 130 can communicate to the CPU 120 that the update for the firmware 112 is unavailable. To that end, as part of the process 220, the BMC 130 can send a response message indicative or otherwise representative of the update being unavailable. Such a message also can be sent, for example, using the hypermedia REST interface relied on to receive the query message. As such, the BMC 130 can execute (or, in some instances, can continue executing) the management module 214 to configure response data according to a JSON format based on OData, and to include the response data in the response message.

The update driver 116 can receive, via the CPU 120, the response message that conveys the absence of the update for the firmware 112. Upon or after the response message is received, the CPU 120 can execute the FFS files 114 from the firmware 112. As discussed herein, the FFS files can be executed from the firmware 112 in a process 230, as part of the boot-up process of the computing system that includes the firmware 112. Upon or after execution of each one of the FFS files 114, the CPU 120 can determine if the boot-up process is complete upon or after the execution of the firmware component. The boot-up process ends in response to a positive determination or continues in response to a negative determination.

In the alternative, in other scenarios, the BMC 130 determine that an update for the firmware 112 is available. To that end, the BMC 130 can determine that at least one of the record(s) representative of availability of the update has a value indicative of presence of an update for a group of FFS files or other types of firmware components associated with the firmware 112.

In response to the update for the firmware 112 being present, the BMC 130 can execute a virtual media module 218 in order to make available the update to the CPU 120. As disclosed herein, to that end, the BMC 130 can configure a virtual drive device (e.g., a USB virtual drive device) by mounting the group of one or more updated images 142. Such a group includes one or more new executable images that correspond to a subset (or, in some embodiments, the entirety) of the FFS files 114 of the firmware 112. In addition, or in another embodiment, the BMC 130 can provide a service that exposes the group of one or more updated images 142 to the CPU 120, via defined methods and properties. Further, or in yet another embodiment, the BMC 130 can provide an address of a network location storing the update for the second firmware component to the CPU 120.

In addition, also in response to the update for the firmware 112 being present, the BMC 130 can send a response message to the CPU 120, as part of the process 220. The response message can be sent, for example, using the hypermedia REST interface relied on to receive the query message. As such, the BMC 130 can execute (or, in some instances, can continue executing) the management module 214 to configure response data according to a JSON format based on OData, and to include the response data in the response message. The response data can be configured, for example, as non-standard data within a standard property. As mentioned, the non-standard data can include a data path or another type of location (e.g., a virtual memory address) of the updated image(s) 142 that constitute the update for the firmware 112. The response data can be indicative or otherwise representative of an update instruction to retrieve such an update either from the virtual drive or by means of the service provided by the BMC 130.

As disclosed herein, the order in which the BMC 130 makes available the group of one or more updated images 142 and sends the instruction to retrieve the updated for the firmware 112 is not limited to the foregoing order. In some instances, depending on the architecture of the BMC 130, the BMC 130 can make available the group of one or more updated images 142 nearly concurrently with the submission of such an instruction.

The CPU 120 can execute (or can continue executing) the update driver 116 to receive the instruction to retrieve the update for the group of FFS files. In response, the CPU 120 can retrieve the updated executable image(s) 142 that constitute the group of FFS files or other types of firmware components that embody the update for the firmware 112. To that point, the CPU 120 can execute the update driver 116 to implement the fetch process 127, for example, to retrieve the updated executable image(s) 142 either from the virtual drive or by means of the service provided by the BMC 130.

Execution of the update driver 116 also can cause the CPU 120 to retain the update for the group of FFS files or other types of firmware components. As disclosed herein, the update can be retained in the main memory 150. Specifically, the one or more new executable images that constitute the group of FFS files can be retained in respective updated FFS file(s) 154.

Upon or after the updated executable image(s) 142 are retained within respective updated FFS file(s) 154, the CPU 120 can execute or continue executing the update driver 116 to identify a FFS file from the FFS files 114 to execute as part of a boot-up process of a computing system that includes the firmware 112. To that end, the CPU 120 can determine or otherwise obtain a unique identifier of the FFS file. The unique identifier can be embodied in or can include a GUID, a file name of the first FFS file, a combination thereof, or the like. In some embodiments, the CPU 120 can identify an image of a hardware driver or an image of a virtual hardware driver, determining an appropriate unique identifier regardless of the type of image that is identified.

In addition, execution of the update driver 116 can cause the CPU 120 to determine, as part of the operation 131, if the identified FFS filed is included in the updated FFS file(s) 154. A negative determination can cause the CPU 120 to execute the FFS file from the non-volatile memory 110, as part of a process 245a. In the alternative, a positive determination can cause the CPU 120 to execute an updated version of the identified FFS file from the main memory 150, as part of a process 245b.

The CPU 120 can execute or can continue executing the update driver 116 to determine if the boot-up process is complete upon or after either one of the execution of the identified FFS file from the non-volatile memory 110 or the execution of the updated version of the identified FFS file from the main memory 150. The boot-up process ends in response to a positive determination. In the alternative, in response to a determination that the boot-up process is not complete, the boot-up process continues by identifying another FFS file from the FFS files 114; determining if the other FFS file is included in the updated FFS file(s) 154; either executing an extant version of the FFS file from the non-volatile memory 110 or executing an updated version of the FFS file from the main memory 150; and further determining if the boot-up process is complete. The foregoing iterations continue until the entirety of the FFS files are 114 traversed.

As disclosed herein, the boot-up process performed by the CPU 120 can correspond to a current or otherwise updated version of the firmware 112, without reliance on changes to the contents of the non-volatile memory device 110 as it typically is the case in conventional technologies. Thus, a computing system in accordance with aspects described herein can be maintained straightforwardly, without burdensome techniques for updating hardware. Instead, in some embodiments, as is illustrated in FIG. 2, the BMC 130 can maintain up-to-date information on firmware components having respective updates.

More specifically, the BMC 130 can maintain update indicator(s) 244 and/or one or more data structures 246 (collectively referred to as update attribute(s) 246) including information indicative of a FFS file or another firmware component for which an update is available. The updated indicator(s) 244 and the update attribute(s) 246 can constitute, in some embodiments, the update availability information 136. To that end, the BMC 130 can be functionally coupled to a management client device 250 via at least network elements 255 of one or more networks. The network elements 255 can include wireless elements and/or non-wireless elements, such as gateway devices, switch devices, network adapters, access point devices, wireline links, wireless links, a combination thereof, or the like. While shown as separate entities, network elements 255 and network elements 145 can be included, at least in part, within a common network. In other words, in some embodiments, the management client device 250 and the repository 140 can be included in a same backend management platform.

The BMC 130 can execute the management module 214 or another server (such as a webserver; not shown) to receive, from the management client device 250, first data indicative of a group of updates for respective ones of a group of firmware components (e.g., FFS files, such as EFI drivers or EFI applications). The first data can include, for example, one or more values of respective one or more attributes for each (or, in some embodiments, at least one) FFS file of the group of FFS files.

In one embodiment, the BMC 130 can receive the first data using a hypermedia REST interface (represented with the label "RESTful"). The first data can be represented as a non-standard resource of the hypermedia REST interface, where the first data can be expressed using a JSON format based on OData. The BMC 130 also can execute (or, in some instances, can continue executing) the management module 214 to configure second data indicative of each one of the group of updates being available. To that point, in one embodiment, for each FFS file in the group of FFS files, the BMC 130 can configure a first data structure (e.g., a one-bit flag or record) indicative of an update for the firmware component being available. In addition, or in another embodiment, configuring the second data also can include generating a second data structure indicative of an identity of the firmware component. The second data structure can include an attribute or a combination of attributes of the firmware component that uniquely identify the firmware component. The BMC 130 can retain the second data within the update attribute(s) 246.

Figure 3:
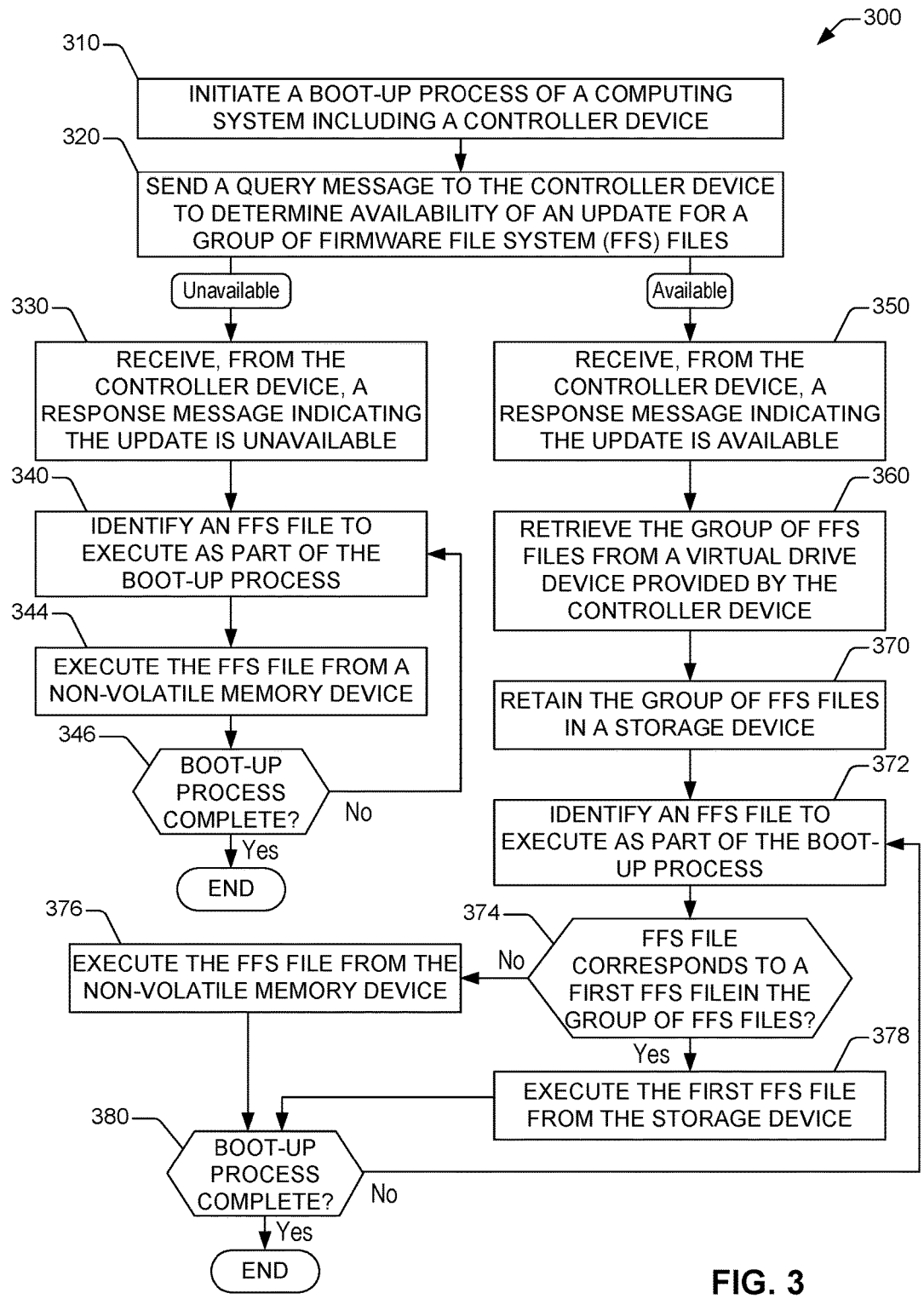
FIG. 3 illustrates an example of a method for updating a discrete firmware component in accordance with one or more embodiments of the disclosure.

FIG. 3 illustrates an example method 300 for updating a discrete firmware component in accordance with one or more embodiments of the disclosure. While the discrete firmware component is illustrated as a FFS file, the example method 300 is not limited in that respect and in some embodiments, other types of firmware components can be contemplated. To that point, in one aspect, the discrete firmware component can be embodied or can include a discrete portion of a firmware that is individually replaceable and executable. Such a discrete portion is retained within a partitioning of a non-volatile memory device that retains the firmware and is uniquely identifiable within the scope of a software system that includes the firmware. As mentioned, such a discrete portion includes a defined group of machine-accessible instructions and/or machine-readable data to provide a particular firmware functionality in response to execution.

A processor (or, in some embodiments, multiple processors) executing the firmware of a host computing device can perform the example method 300. The firmware can include machine-accessible instructions that, in response to execution by the processor or another computing device, can cause the processor to perform the example method 300. For instance, the machine-accessible instructions can embody or can constitute the update driver 116 in accordance with aspects of this disclosure. Such machine-accessible instructions can be encoded on a non-transitory computer-readable storage medium, such as one or more memory devices.

The processor can form part of a computing chipset and can include one or more processing cores. The example method 300 can be performed as part of a boot-up process of a computing system that includes the host computing device and a controller device in accordance with aspects of this disclosure. For instance, the controller device can be embodied in or can include the BMC 130. The controller device can be functionally coupled to the host computing device or integrated therein.

At block 310, the processor that executes the firmware can initiate a boot-up process of the computing system. As mentioned, the computer system includes a controller device, such as the BMC 130.

At block 320, the processor can send a query message to the controller device (e.g., BMC 130) in order to determine availability of an update for a group of FFS files. The group of FFS files can include one FFS file or multiple FFS files.

As mentioned, in one embodiment, the update for the group of FFS files can include a new image of hardware driver. In addition, or in another embodiment, the update for the group of FFS files can include a new image of a virtual hardware driver. The query message can be sent using a hypermedia REST interface, where the processor can send data representative of the query message using the hypermedia REST interface. The data can be expressed using a JSON format based on OData.

In a scenario in which the update is unavailable, the flow of the example method 300 continues to block 330 where the processor can receive, from the controller device (e.g., BMC 130), a response message indicative of the update for the group of FFS files being unavailable. Such a response message is responsive to the query message and can be received using a hypermedia REST interface. As such, the controller device can receive data representative of the response message using the hypermedia REST interface, where the data can be expressed using a JSON format based on OData.

In addition, at block 340, the processor can identify an FFS file to execute as part of the boot-up process. In addition, the FFS file can be retained in a non-volatile memory device (e.g., non-volatile memory device 110) of the host computing device. In some embodiments, to identify the FFS file, the processor can identify an image of a hardware driver that embodies or constitutes the FFS file. In other embodiments, to identify the FFS file, the processor can identify an image of a virtual device driver that embodies or otherwise constitutes the FFS file.

Flow of the example method 300 can continue to block 344, at which the processor can execute the FFS file from a non-volatile memory device (e.g., non-volatile memory device 110). The non-volatile memory device retains a firmware that includes the FFS file. At block 346, the processor can determine if the boot-up process is complete. In response to a negative determination, flow is redirected to block 340 in order for the boot-up process to continue. In the alternative, the boot-up process ends in response to a determination that the boot-up process is complete.

With further reference to block 320, in a scenario in which the update is available, the flow of the example method 300 continues to block 350 where the processor can receive a response message indicative of the update for the group of FFS files being available. Such a response message is responsive to the query message and can be received from the controller device (e.g., BMC 130).

Upon or after the response message is received, at block 360, the processor can retrieve the update for the group of FFS files from a virtual drive device provided by the controller device (e.g., BMC 130) in accordance with aspects described herein. To that end, in some embodiments, the response message can include an instruction to retrieve such an update. Receiving the update instruction can include, for example, receiving data using a hypermedia REST interface. The data is representative of the instruction and can be expressed using a JSON format based on OData. In addition, or in other embodiments, receiving the data can include receiving non-standard data in a standard property. The non-standard data can include, for example, a data path or another type of location (e.g., a virtual memory address) of the update for the group of FFS files. In some embodiments, the other type of location can be a network location at which the update for the FFS file is stored. Accordingly, the processor can retrieve the update for the group of FFS files (or, in some embodiments, instructions that constitute the update) from the network location.

At block 370, the processor can retain the update for the group of FFS files in a storage device. In one example, the storage device can be embodied in a main memory device (e.g., a RAM device) and the update or the instructions that constitute the update can be retained in the main memory device. In one aspect, the processor can retain respective new executable images for the group of the FFS files in the storage device. Flow of the example method 300 continues to block 372.

At block 372 the processor that executes the firmware can identify an FFS file to execute as part of the boot-up process. As mentioned, in some embodiments, to identify the FFS file, the processor can identify an executable image of a hardware driver that embodies or constitutes the FFS file. In other embodiments, to identify the FFS file, the processor can identify an executable image of a virtual device driver that embodies or otherwise constitutes the FFS.

The processor can determine, at block 374, if the FFS file identified at block 372 corresponds to a first FFS file included in the group of FFS files. To that end, in one example, the processor can determine if a match exist between a GUID of the FFS file and another GUID associated with an FFS file included in the group of FFS files. In response to an affirmative determination, e.g., such a match does exist, the processor can execute the first FFS file from the storage device (e.g., a main memory device) at block 378. Flow of the example method 300 can then continue to block 380, in which the processor can determine if the boot-up process is complete.

In the alternative, in response to a negative determination at block 374, e.g., there is no match between the GUID of the identified FFS files and each one of the group of FFS files, the processor can execute the FFS file from the non-volatile memory device. Flow of the example method 300 can then continue to block 380, in which the processor can determine if the boot-up process is complete.

Regardless of the operation that leads to block 380, in response to a negative determination that the boot-up process is complete, the flow of the example method 300 is redirected to block 372 and the boot-up process continues. In the alternative, the example method 300 ends in response to the boot-up process being completed.

Figure 4:
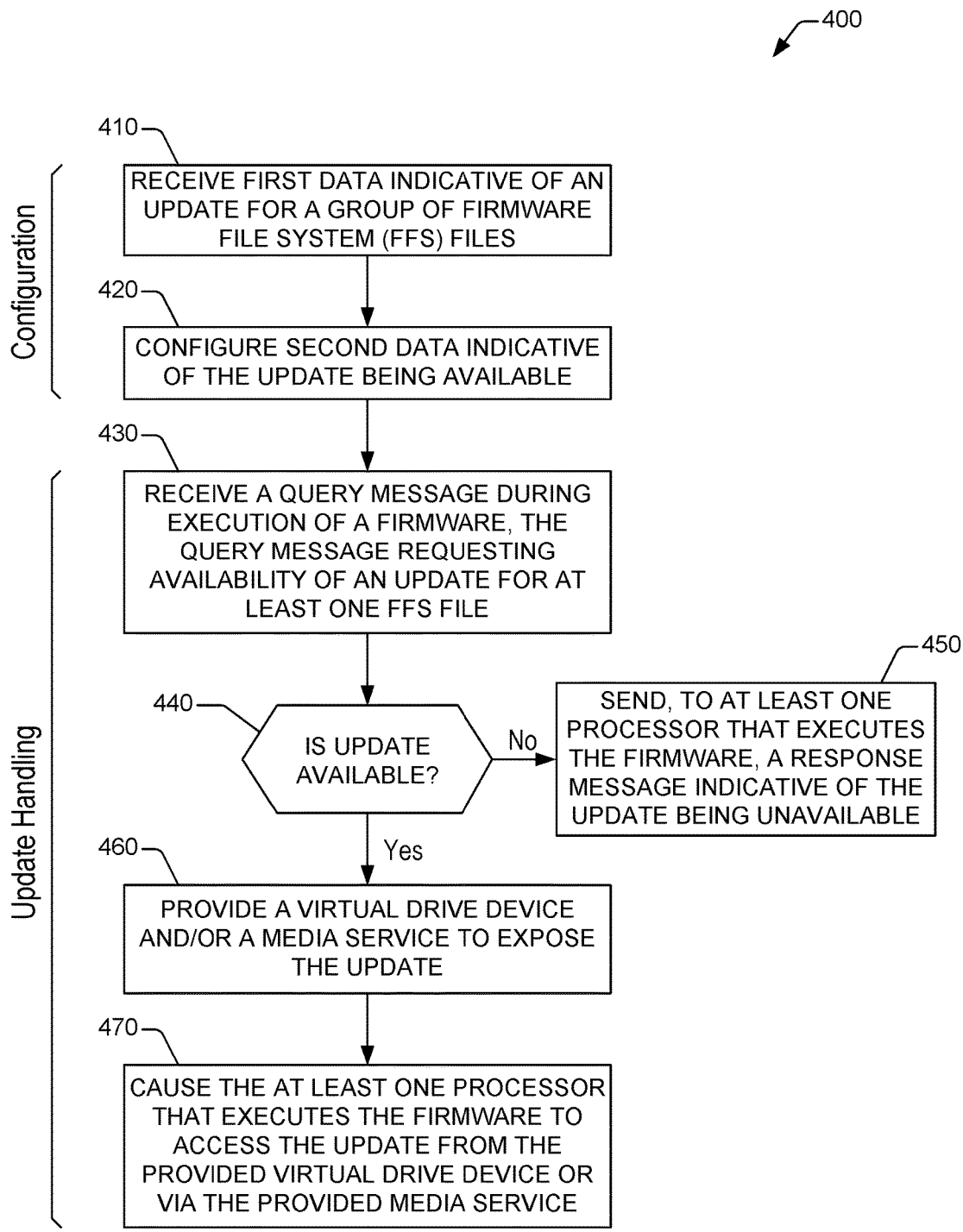
FIG. 4 illustrates another example of a method for updating a discrete firmware component in accordance with one or more embodiments of the disclosure.

FIG. 4 illustrates an example method 400 for updating a discrete firmware component in accordance with one or more embodiments of the disclosure. As disclosed herein, the discrete firmware component can be embodied in or can include a FFS file (e.g., an EFI driver or an EFI application). The example method 400 is not limited in that respect, however, and can be implemented for other types of firmware components. For instance, the example method 400 can be implemented for one or more discrete portions of firmware, where each one of the discrete portions is individually executable and replaceable, and also is uniquely identifiable within a computing system.

A controller device in accordance with this disclosure can perform the example method 400. For instance, the controller device can be embodied in or can include the BMC 130. Therefore, in some embodiments, the controller device can include machine-accessible instructions that, in response to execution by the controller device (or, more particularly, at least one processor therein or coupled thereto) can cause the controller device to perform the example method 400. For instance, the machine-accessible instructions can embody or can constitute the management server 210 in accordance with aspects of this disclosure. Such machine-accessible instructions can be encoded on a non-transitory computer-readable storage medium, such as one or more memory devices. As discussed herein, the controller device can form part of a computing system including at least one processor that can execute a firmware associated with the discrete firmware component.

At block 410, the controller device (e.g., the BMC 130) can receive first data indicative of an update for a group of FFS files. The first data can be received from a client device that is functionally coupled to the controller device via a network (e.g., a wireless network, a wireline network, or a combination thereof). The client device can be embodied in or can include, for example, the management client device 250 disclosed herein. The first data can include, for example, one or more values of respective one or more attributes for each (or, in some embodiments, at least one) FFS file of the group of FFS files. Specifically, in one embodiment, the first data can be received using a hypermedia REST interface, where the first data can be represented as a non-standard resource of the hypermedia REST interface and the first data can be expressed using a JSON format based on OData. As such, receiving the one or more values can include using such a hypermedia REST interface, where the one or more values can be expressed using a JSON format based on OData. To receive such first data, the controller device can execute a module (such as management module 214) that can receive the first data using such a RESTful interface.

At block 420, the controller device (e.g., the BMC 130) can configure second data indicative of the update being available. In one embodiment, configuring the second data can include generating a first data structure (e.g., a one-bit flag or record) indicative of the update for the group of FFS files being available. In addition, or in other embodiments, for each FFS file in the group of FFS files, configuring the second data can include generating a first data structure (e.g., a one-bit flag or record) indicative of an update for the FFS file being available. Configuring the second data also can include generating a second data structure indicative of an identity of the FFS file. The second data structure can include an attribute or a combination of attributes of the FFS file that uniquely identify the FFS file. In addition, or in some embodiments, configuring the second data can include retaining the second data in a memory device integrated into the controller device and/or another memory device functionally coupled to the controller device. The controller device can execute a module (e.g., the management module 214) in order to configure the second data as described herein.

At block 430, the controller device (e.g., the BMC 130) can receive a query message requesting availability of an update for at least one FFS file. The query message can be received from at least one processor during the execution of a firmware of a computing system. As disclosed herein, the computing system includes the controller device and the at least one processor. Similar to other query messages of this disclosure, the query message can be received using a hypermedia REST interface. To that end, the controller device can receive data representative of the query message using the hypermedia REST interface, where the data is expressed using a JSON format based on OData.

At block 440, the controller device (e.g., the BMC 130) can determine if the update for the at least one FFS file is available using at least the second data configured at block 420. For instance, the controller device can assess a data structure indicative or otherwise representative of availability of the update for a group of FFS files. In one example, the data structure can be embodied in or can include a one-bit flag or record. In response to a negative determination at block 440, flow of the example method 400 can continue to block 450, where the controller device can send a response message indicative of the update being unavailable. The response message can be sent to at least one processor that executes the firmware. The response message can cause the at least one processor to proceed with execution of FFS files and/or other types of firmware components already included in the firmware. The response message can be sent using numerous interfaces that rely on defined communication protocols. For instance, the response message can be sent using a hypermedia REST interface. As such, in one embodiment, the controller device can send data using the hypermedia REST interface, where the data is representative of the response message and is expressed using a JSON format based on OData.

In response to a determination that the update for the FFS file is available at block 440, flow of the example method 400 continues to block 460 where the controller device (e.g., BMC 130) can expose the update for the at least one FFS file. To that end, the controller device can provide a virtual drive device and/or a media service. More specifically, the controller device can execute the virtual media module 216 disclosed herein. In addition, or in some embodiments, the controller device can provide an address of a network location storing the update for the FFS file to the at least one processor that executes the firmware.

Further, at block 470, the controller device (e.g., BMC 130) can cause the at least one processor that executes the firmware to access or otherwise retrieve the update for the at least one FFS file from the provided virtual drive device or by means of the provided media service. To that end, in some embodiments, the controller device can execute the management module 214 to cause the controller device to send an instruction to access or otherwise retrieve the update in such a fashion. The instruction can be included in a response message that is responsive to the query message received at block 430. The response message can be sent to the at least one processor using a hypermedia REST interface. Specifically, the controller device can send instruction data within the response message using the hypermedia REST interface. The instruction data is representative of the instruction and can be expressed using a JSON format based on OData.

Collectively, block 410 and block 420 constitute a configuration portion of the example method 400 and need not be implemented as part of a boot-up process of a computing system for which can update may be available. In contrast, blocks 430 to 470 are implemented during a boot-up process and constitute an update handling portion of the example method 400. Accordingly, the configuration portion and the update handling portion can be implemented asynchronously relative to each other. Therefore, updates to firmware components can be configured without disrupting the operation of a host computing device, which can provide superior flexibility and/or efficiency relative to conventional technologies for updating firmware. Further, when implemented in combination with the example method 300, the update handling portion of the example method 400 permits or otherwise facilitates a non-destructive update of discrete component(s) of a firmware.

Figure 5:
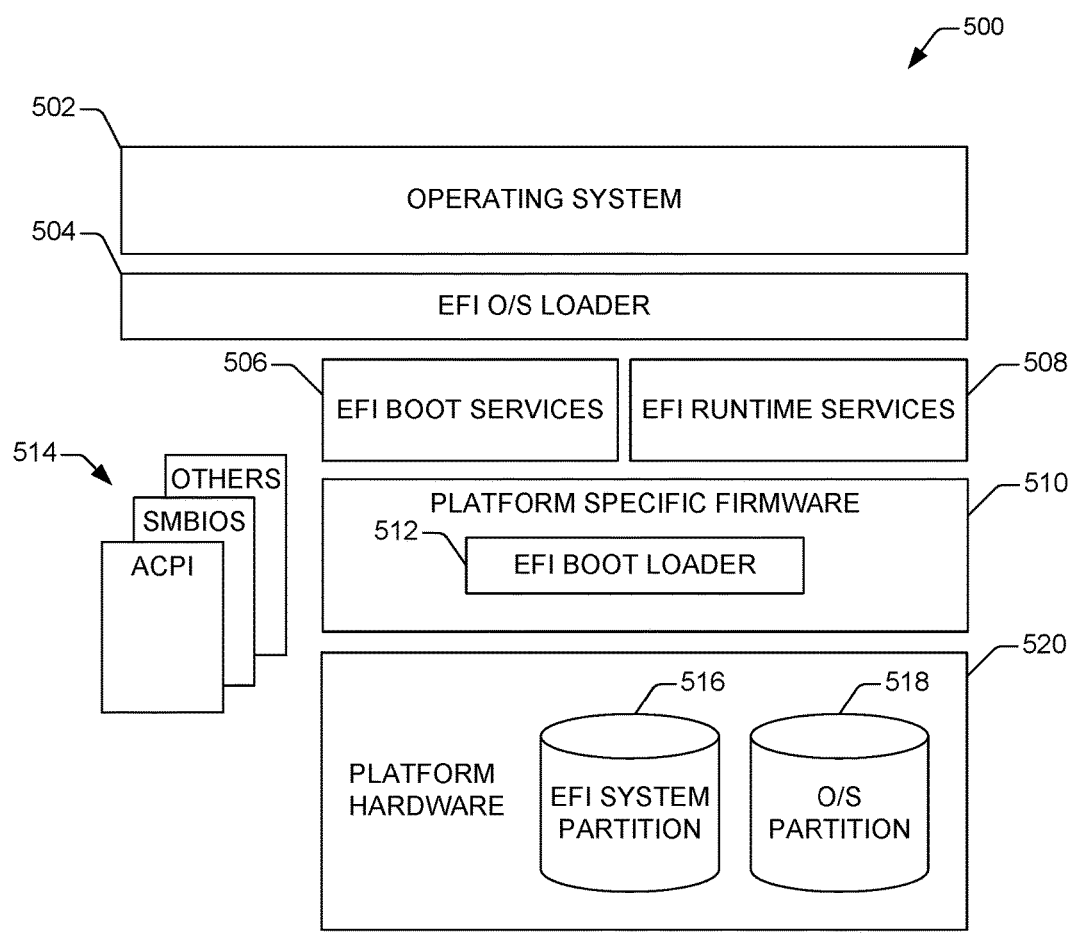
FIG. 5 illustrates an example of a software architecture for a unified extensible firmware interface (UEFI)-compliant firmware that provides an operating environment for aspects of the technologies presented herein in one or more embodiments.

FIG. 5 illustrates an example of a software architecture 500 that includes a UEFI Specification-compliant firmware that can be configured to provide and/or utilize aspects of the technologies disclosed herein. In particular, the firmware architecture shown in FIG. 5 can be utilized to implement the firmware 112 described above. The firmware 112 can also be implemented in other ways in other configurations.

The UEFI Specification describes an interface between an operating system 502 and a UEFI Specification-compliant firmware 500. The UEFI Specification also defines an interface that the firmware 500 can implement, and an interface that the operating system 502 (which might be referred to herein as an OS) can use while booting. How a firmware implements the interface can be left up to the manufacturer of the firmware. The UEFI Specification also defines a way for the operating system 502 and the firmware 500 to exchange information necessary to support the operating system boot process. The terminology "UEFI Specification" used herein refers to both the EFI Specification developed by INTEL CORPORATION and the UEFI Specification managed by the UEFI FORUM.

As is illustrated in FIG. 5, the architecture can include platform hardware 520, such as that described below with regard to FIG. 6, and the operating system 502. A boot loader 512 for the operating system 502 can be retrieved from the UEFI system partition 516 using a UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Upon or after started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the ACPI and the System Management BIOS (SMBIOS) specifications can be supported.

UEFI boot services 506 can provide interfaces for devices and system functionality used during boot time. UEFI runtime services 508 can also be available to the UEFI OS loader 504 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 502 and firmware 500, the Framework is a group of specifications that together describe a firmware implementation that has been designed to perform the full range of operations that are required to initialize a platform from power on through transfer of control to the operating system 502. The specifications that make up the Framework, which are also available from INTEL CORPORATION, are also expressly incorporated herein by reference.

Figure 6:
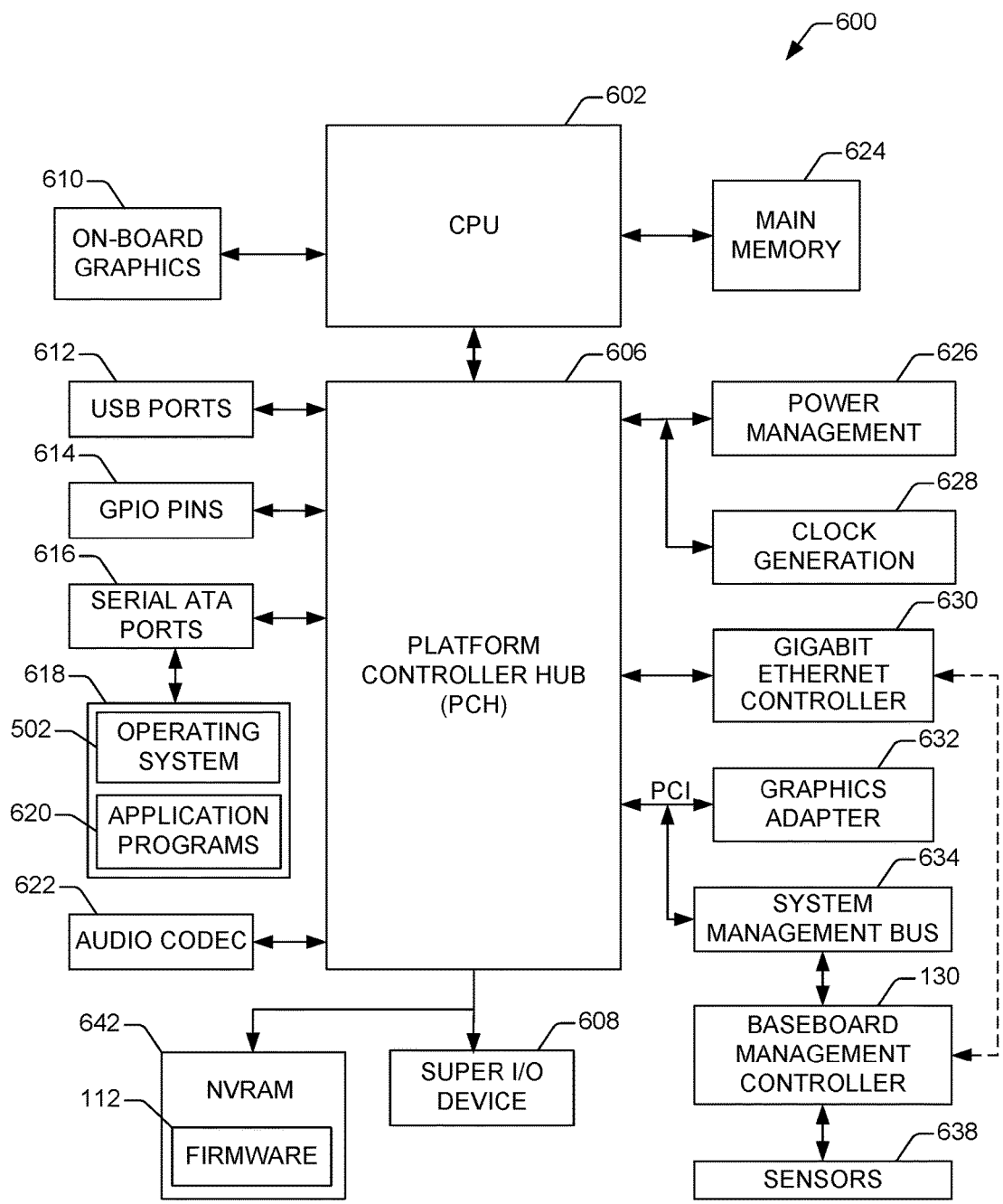
FIG. 6 illustrates an example of a computer architecture for a computer that can implement the technologies disclosed herein, in accordance with one or more embodiments.

FIG. 6 illustrates an example of a computer architecture that can provide an operating environment for the technologies presented herein. For example, the computer architecture can be utilized to implement the computing architecture 100 and/or any of the other managed computing systems disclosed herein.

FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, it is noted that the configurations described herein can be practiced with other computer system configurations, including hand-held devices, multi-processor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 illustrates an example of a computer architecture for a computer 600 that can be utilized in the implementations described herein. The illustrative computer architecture shown in FIG. 6 includes a baseboard, or "motherboard", which is a printed circuit board to which a multitude of components or devices can be connected by way of a system bus or other electrical communication path. In one configuration, a CPU 602 operates in conjunction with a Platform Controller Hub (PCH) 606. The CPU 602 is a central processor that performs arithmetic and logical operations necessary for the operation of the computer 600. The computer 600 can include a multitude of CPUs 602. Each CPU 602 can include multiple processing cores.

The CPU 602 provides an interface to one or more RAM devices used as the main memory 624 in the computer 600 and, possibly, to an on-board graphics adapter 610. The PCH 606 provides an interface between the CPU 602 and the remainder of the computer 600.

The PCH 606 can also be responsible for controlling many of the input/output functions of the computer 600. In particular, the PCH 606 can provide one or more universal serial bus (USB) ports 612, an audio codec 622, a Gigabit Ethernet Controller 632, and one or more general purpose input/output (GPIO) pins 614. The USB ports 612 can include USB 2.0 ports, USB 3.0 ports and USB 3.1 ports among other USB ports. The audio codec 622 can include Intel High Definition Audio, Audio Codec '97 (AC'97) and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices, such as the on-board graphics adapter 632. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment (SATA) adapter for providing one or more serial ATA ports 616. The serial ATA ports 616 can be connected to one or more mass storage devices storing an OS, such as OS 502 and application programs 620, such as a SATA disk drive 618. As known to those skilled in the art, an OS 502 comprises a set of programs that control operations of a computer and allocation of resources. An application program is software that runs on top of the operating system 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system or one of its variants. It is noted that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it is noted that computer-readable storage media can be any available media that can be accessed by the computer 600.

As an illustration, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 600.

Communication media can embody information in a data signal, such as a modulated data signal (e.g., a carrier wave or another transport mechanism) and includes information delivery media or transport media. In some embodiments, the information can include machine-accessible instructions (e.g., computer-readable instructions and/or computer-executable instructions), data structures, program modules, or other structured or unstructured data. The terminology "modulated data signal" as utilized herein refers to a signal that has one or more of its characteristics set or changed in such a manner as to encode information in the signal. Communication media include wired media and wireless media. For example, wired media can include a wired network and/or direct-wired connection including solid-state media for the transport of signals. As another example, wireless media can include numerous media for the wireless transport of electromagnetic radiation, such as acoustic waves, RF waves, infrared waves, microwave waves, and other forms of electromagnetic waves.

A low pin count (LPC) interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 642 for storing firmware 112 that includes program code containing the basic routines that help to start up the computer 600 and to transfer information between elements within the computer 600 as discussed above with regard to FIG. 5.

The program modules disclosed herein, including the firmware 112, can include software instructions that, when loaded into the CPU 602 and executed, transform a general-purpose computer into a special-purpose computer customized to permit or otherwise facilitate all, or part of, the operations disclosed herein. As detailed throughout this disclosure, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to: the technology used to implement the storage media, whether the storage media are characterized as primary or secondary storage, and the like. For example, if the storage media are implemented as semiconductor-based memory, the program modules can transform the physical state of the main memory 624 (e.g., a semiconductor solid-state memory device) and/or the NVRAM 604. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described herein, the PCH 606 can include a system management bus 634. As discussed above, when utilized to implement the computing architecture 100 and/or the computing architecture 200, the system management bus 634 can include a BMC 130. As discussed herein, the BMC 130 is a microcontroller that monitors operation of the computer 600. In a more specific configuration, the BMC 130 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, for example, the BMC 130 can be communicatively connected to one or more components by way of the system management bus 634 in some configurations.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 130 functions as the master on the system management bus 634 in most circumstances, but can also function as either a master or a slave in other circumstances. Each of the various components communicatively connected to the BMC 130 by way of the system management bus 634 is addressed using a slave address. The system management bus 634 is used by the BMC 130 to request and/or receive various operating and performance-related parameters from one or more components, such as the firmware 112, which are also communicatively connected to the system management bus 634.

It is noted that the functionality provided by the computer 600 can be provided by other types of computing devices, including hand-held computers, smartphones, gaming systems, set top boxes, tablet computers, embedded computer systems, personal digital assistants, wearable devices, and other types of computing devices available in the art. It is also contemplated that the computer 600 might not include all the components shown in FIG. 6; can include other components that are not explicitly shown in FIG. 6; or might utilize an architecture completely different than that shown in FIG. 6.

Numerous other embodiments emerge from the foregoing detailed description and annexed drawings. For instance, an Example 1 of those embodiments includes a method, where the method includes sending, as part of a boot-up process of a computing system, a query message to a baseboard management controller (BMC) to determine availability of an update for a firmware of the computing system, the firmware stored in a non-volatile memory device of the computing system; receiving, from the BMC, responsive to the query message, a response message including an instruction to retrieve a group of firmware file system (FFS) files that form the update from a virtual drive device provided by the BMC; retrieving the group of FFS files from the virtual drive device; retaining the group of FFS files in a main memory device; identifying an FFS file to execute as part of the boot-up process, the FFS file included in the firmware stored in the non-volatile memory device; determining that the FFS file corresponds to a first FFS file in the group of FFS files; and executing the first FFS file from the main memory device as part of the boot-up process.

An Example 2 of the numerous embodiments includes the method of Example 1 and further includes sending a second query message to the BMC to determine availability of an update for the firmware; receiving, from the BMC, responsive to the second query message, a second response message indicative of the update for the firmware being unavailable; and executing a second group of FFS files that form the firmware from the non-volatile memory device.

An Example 3 of the numerous embodiments includes the method of Example 1, where the sending the query message comprises sending data using a hypermedia representational state transfer (REST) interface, the data expressed using a JavaScript Object Notation (JSON) based on Open Data Protocol (OData).

An Example 4 of the numerous embodiments includes the method of Example 1, where the receiving the response message comprises receiving data using a hypermedia REST interface, the data expressed using a JSON based on OData.

An Example 5 of the numerous embodiments includes the method of Example 1, wherein the identifying the FFS file comprises identifying an image of a hardware driver, and wherein the first FFS file comprises a new image of the hardware driver.

An Example 6 of the numerous embodiments includes the method of Example 1, where the identifying the FFS file includes identifying an image of a virtual device driver, and wherein the first FFS file comprises a new image of the virtual hardware driver.

An Example 7 of the numerous embodiments includes a method, where the method includes receiving, at a baseboard management controller (BMC), first data indicative of an update for a group of firmware file system (FFS) files; configuring, at the BMC, second data indicative of the update for the group of FFS files being available; receiving, from a processor that executes a firmware, a query message requesting availability of an update for at least one FFS file; determining that the update is available using at least the second data; providing at least one of a virtual drive device or a media service to expose the update for the FFS file; and causing, responsive to the query message, the processor that executes the firmware to access the at least one FFS file from one of the provided virtual drive device or the provided media service. An Example 8 of the numerous embodiments includes the method of Example 7, where the receiving the first data comprises receiving one or more values of respective one or more attributes of a first one of the group of FFS files, the first data represented as a non-standard resource of a hypermedia REST interface and expressed using a JSON based on OData.

An Example 9 of the numerous embodiments includes the method of Example 8, where the receiving the one or more values comprises using a hypermedia REST interface, the one or more values expressed using a JSON based on OData.

An Example 10 of the numerous embodiments includes the method of Example 7, where the receiving the query message comprises receiving data using a hypermedia representational state transfer (REST) interface, the data expressed using a JSON based on OData. An Example 11 of the numerous embodiments includes the method of Example 8, wherein the causing the processor that executes the firmware to access the update for the FFS file comprises sending a response message using a hypermedia representational state transfer (REST) interface, the data expressed using a JavaScript Object Notation (JSON) based on Open Data Protocol (OData).

An Example 12 of the numerous embodiments includes the method of Example 11, where the sending the response message includes sending, to the processor that executes the firmware, an instruction to retrieve the update for the FFS file from the provided virtual drive device or the provided media service.

An Example 13 of the numerous embodiments includes the method of Example 12, wherein the sending the instruction comprises sending third data using a hypermedia representational state transfer (REST) interface, the third data expressed using a JavaScript Object Notation (JSON) based on Open Data Protocol (OData).

An Example 14 of the numerous embodiments includes the method of Example 13, where the sending the third data using the hypermedia REST interface comprises configuring non-standard data in a standard property.

An Example 15 of the numerous embodiments includes at least one non-transitory computer-readable storage medium having instructions stored thereon that, in response to execution, cause a computing system to perform operations including sending, as part of a boot-up process of a computing system, a query message to a baseboard management controller (BMC) to determine availability of an update for a firmware of the computing system, the firmware stored in a non-volatile memory device of the computing system; receiving, from the BMC, responsive to the query message, a response message including an update instruction to retrieve a group of firmware file system (FFS) files that form the update from a virtual drive device provided by the BMC; retrieving the group of FFS files from the virtual drive device; retaining the group of FFS files in a main memory device; identifying an FFS file to execute as part of the boot-up process, the FFS file included in the firmware stored in the non-volatile memory device; determining that the FFS file corresponds to a first FFS file in the group of FFS files; and executing the first FFS file from the main memory device as part of the boot-up process.

An Example 16 of the numerous embodiments includes the at least one non-transitory computer-readable storage medium of Example 15, where the operations further include identifying a second FFS file to execute as part of the boot-up process; sending a second query message to the BMC to determine availability of an update for the second FFS file; receiving, from the BMC, responsive to the second query message, a second response message indicative of the update for the second FFS file being unavailable; and executing the second FFS file.

An Example 17 of the numerous embodiments includes the at least one non-transitory computer-readable storage medium of Example 15, wherein the sending the query message comprises sending data using a hypermedia REST interface, the data expressed using a JSON based on OData.

An Example 18 of the numerous embodiments includes the at least one non-transitory computer-readable storage medium of Example 15, wherein the receiving the response message comprises receiving data using a hypermedia REST interface, the data expressed using a JSON based on OData.

An Example 19 of the numerous embodiments includes the at least one non-transitory computer-readable storage medium of Example 15, where the operations further include receiving, at the BMC, first data indicative of an update for a group of FFS files; configuring, at the BMC, second data indicative of the update for the group of FFS files being available; receiving, at the BMC, the query message from at least one processor configured to execute the firmware; determining that the update for the firmware is available using at least the second data; providing the virtual drive device to expose the update for the FFS file; and causing, responsive to the query message, a processor that executes a firmware to access the update from the virtual drive device.

An Example 20. of the numerous embodiments includes the at least one non-transitory computer-readable storage medium of Example 19, where the causing the processor that executes the firmware to access the update comprises sending, to the processor that executes the firmware, an instruction to retrieve the group of FFS files from the virtual drive device.

An Example 21 of the numerous embodiments includes the at least one non-transitory computer-readable storage medium of Example 20, where sending the instruction comprises sending third data using a hypermedia representational state transfer (REST) interface, the third data expressed using a JavaScript Object Notation (JSON) based on Open Data Protocol (OData).

An Example 22 of the numerous embodiments includes the at least one non-transitory computer-readable storage medium of Example 21, where the sending the third data using the hypermedia REST interface comprises configuring non-standard data in a standard property.

An Example 23 of the numerous embodiments includes a computing system that includes at least one processor; a baseboard management controller (BMC); and at least one memory device having instructions stored thereon that, in response to execution, cause the computing system at least to: send, as part of a boot-up process of a computing system, a query message to the BMC to determine availability of an update for a firmware of a computing system, the firmware stored in a non-volatile memory device of the computing system; receive, from the BMC, responsive to the query message, a response message including an update instruction to retrieve a group of firmware file system (FFS) files that form the update from a virtual drive device provided by the BMC; retrieve the group of FFS files from the virtual drive device; retain the group of FFS files in a main memory device; identify a FFS file to execute as part of the boot-up process, the FFS file included in the firmware stored in a non-volatile memory device; determine that the FFS file corresponds to a first FFS file in the group of FFS files; and execute the first FFS file from the main memory device as part of the boot-up process.

An Example 24 of the numerous embodiments includes the computing system of Example 23, where to send the query message, the instructions are configured to cause the computing system to send data using a hypermedia REST interface, the data expressed using a JSON based on OData.

An Example 25 of the numerous embodiments includes the computing system of Example 22, wherein to receive the response message, the instructions are configured to cause the computing system to receive data using a hypermedia representational state transfer (REST) interface, the data expressed using a JavaScript Object Notation (JSON) based on Open Data Protocol (OData).

An Example 26 of the numerous embodiments includes the computing system of Example 23, where in response to execution, the instructions further cause the computing system to receive, at the BMC, first data indicative of an update for a group of FFS files; configure second data indicative of the update for the group of FFS files being available; receive, at the BMC, the query message from at least one processor configured to execute the firmware; determine that the update for the group of FFS files is available using at least the second data; and send, to a firmware, responsive to the query message, the response message indicative of the update for the FFS file being available.

An Example 27 of the numerous embodiments includes the computing system of Example 26, where in response to execution, the instructions further cause the computing system to provide the virtual drive device at the BMC; and send the update instruction to retrieve the group of FFS files from the virtual drive device, where the instruction comprises third data sent using a hypermedia representational state transfer (REST) interface and expressed using a JavaScript Object Notation (JSON) based on Open Data Protocol (OData).

Based on the foregoing, technologies for providing or otherwise facilitating a non-destructive update of a firmware or component thereof and applications therefore have been disclosed herein. Although the subject matter presented herein has been described in language specific to computer structural features, methodological acts, and computer readable media, it is to be understood that the present disclosure is not necessarily limited to the specific elements, features, acts, or non-transitory storage media disclosed herein. Rather, the specific elements, features, acts, and non-transitory storage media are disclosed as example forms.

The subject matter disclosed herein is provided by way of illustration only and should not be construed as limiting. Various modifications and changes can be made to the subject matter described herein without following the example configurations and applications illustrated and described, and without departing from the true spirit and scope of the present disclosure.

What is claimed is:

1. A method, comprising:
sending, as part of a boot-up process of a computing system, a query message to a baseboard management controller (BMC) to determine availability of an update for a firmware of the computing system, the firmware stored in a non-volatile memory device of the computing system;
receiving, from the BMC, responsive to the query message, a response message including an instruction to retrieve a group of firmware file system (FFS) files that form the update from a virtual drive device provided by the BMC;
retrieving the group of FFS files from the virtual drive device;
retaining the group of FFS files in a main memory device;
identifying an FFS file to execute as part of the boot-up process, the FFS file included in the firmware stored in the non-volatile memory device;
determining that the FFS file corresponds to a first FFS file in the group of FFS files; and
executing the first FFS file from the main memory device as part of the boot-up process.

2. The method of claim 1, further comprising sending a second query message to the BMC to determine availability of an update for the firmware;
receiving, from the BMC, responsive to the second query message, a second response message indicative of the update for the firmware being unavailable; and
executing a second group of FFS files that form the firmware from the non-volatile memory device.

3. The method of claim 1, wherein the sending the query message comprises sending data using a hypermedia representational state transfer (REST) interface, the data expressed using a JavaScript Object Notation (JSON) based on Open Data Protocol (OData).

4. The method of claim 1, wherein the receiving the response message comprises receiving data using a hypermedia representational state transfer (REST) interface, the data expressed using a JavaScript Object Notation (JSON) based on Open Data Protocol (OData).

5. The method of claim 1, wherein the identifying the FFS file comprises identifying an image of a hardware driver, and wherein the first FFS file comprises a new image of the hardware driver.

6. The method of claim 1, wherein the identifying the FFS file comprises identifying an image of a virtual device driver, and wherein the first FFS file comprises a new image of the virtual hardware driver.

7. At least one non-transitory computer-readable storage medium having instructions stored thereon that, in response to execution, cause a computing system to perform operations comprising:
sending, as part of a boot-up process of a computing system, a query message to a baseboard management controller (BMC) to determine availability of an update for a firmware of the computing system, the firmware stored in a non-volatile memory device of the computing system;
receiving, from the BMC, responsive to the query message, a response message including an update instruction to retrieve a group of firmware file system (FFS) files that form the update from a virtual drive device provided by the BMC;
retrieving the group of FFS files from the virtual drive device;
retaining the group of FFS files in a main memory device;
identifying an FFS file to execute as part of the boot-up process, the FFS file included in the firmware stored in the non-volatile memory device;
determining that the FFS file corresponds to a first FFS file in the group of FFS files; and
executing the first FFS file from the main memory device as part of the boot-up process.

8. The at least one non-transitory computer-readable storage medium of claim 7, the operations further comprising identifying a second FFS file to execute as part of the boot-up process;
sending a second query message to the BMC to determine availability of an update for the second FFS file;
receiving, from the BMC, responsive to the second query message, a second response message indicative of the update for the second FFS file being unavailable; and
executing the second FFS file.

9. The at least one non-transitory computer-readable storage medium of claim 7, wherein the sending the query message comprises sending data using a hypermedia representational state transfer (REST) interface, the data expressed using a JavaScript Object Notation (JSON) based on Open Data Protocol (OData).

10. The at least one non-transitory computer-readable storage medium of claim 7, wherein the receiving the response message comprises receiving data using a hypermedia representational state transfer (REST) interface, the data expressed using a JavaScript Object Notation (JSON) based on Open Data Protocol (OData).

11. The at least one non-transitory computer-readable storage medium of claim 7, the operations further comprising receiving, at the BMC, first data indicative of an update for a group of FFS files;

configuring, at the BMC, second data indicative of the update for the group of FFS files being available;

receiving, at the BMC, the query message from at least one processor configured to execute the firmware;

determining that the update for the firmware is available using at least the second data;

providing the virtual drive device to expose the update for the FFS file; and causing, responsive to the query message, a processor that executes a firmware to access the update from the virtual drive device.

12. The at least one non-transitory computer-readable storage medium of claim 11, wherein the causing the processor that executes the firmware to access the update comprises sending, to the processor that executes the firmware, an instruction to retrieve the group of FFS files from the virtual drive device.

13. The at least one non-transitory computer-readable storage medium of claim 12, wherein sending the instruction comprises sending third data using a hypermedia representational state transfer (REST) interface, the third data expressed using a JavaScript Object Notation (JSON) based on Open Data Protocol (OData).

14. The at least one non-transitory computer-readable storage medium of claim 13, wherein the sending the third data using the hypermedia REST interface comprises configuring non-standard data in a standard property.

15. A computing system, comprising:
at least one processor;
a baseboard management controller (BMC); and
at least one memory device having instructions stored thereon that, in response to execution by the at least one processor, cause the computing system at least to:
send, as part of a boot-up process of a computing system, a query message to the BMC to determine availability of an update for a firmware of a computing system, the firmware stored in a non-volatile memory device of the computing system;
receive, from the BMC, responsive to the query message, a response message including an update instruction to retrieve a group of firmware file system (FFS) files that form the update from a virtual drive device provided by the BMC;
retrieve the group of FFS files from the virtual drive device;
retain the group of FFS files in a main memory device;
identify a FFS file to execute as part of the boot-up process, the FFS file included in the firmware stored in a non-volatile memory device;
determine that the FFS file corresponds to a first FFS file in the group of FFS files; and
execute the first FFS file from the main memory device as part of the boot-up process.

16. The computing system of claim 15, wherein to send the query message, the instructions are configured to cause the computing system to send data using a hypermedia representational state transfer (REST) interface, the data expressed using a JavaScript Object Notation (JSON) based on Open Data Protocol (OData).

17. The computing system of claim 14, wherein to receive the response message, the instructions are configured to cause the computing system to receive data using a hypermedia representational state transfer (REST) interface, the data expressed using a JavaScript Object Notation (JSON) based on Open Data Protocol (OData).

18. The computing system of claim 15, wherein in response to execution, the instructions further cause the computing system to receive, at the BMC, first data indicative of an update for a group of FFS files;
configure second data indicative of the update for the group of FFS files being available;
receive, at the BMC, the query message from at least one processor configured to execute the firmware;
determine that the update for the group of FFS files is available using at least the second data; and
send, to a firmware, responsive to the query message, the response message indicative of the update for the FFS file being available.

19. The computing system of claim 18, wherein in response to execution, the instructions further cause the computing system to provide the virtual drive device at the BMC; and
send the update instruction to retrieve the group of FFS files from the virtual drive device,
wherein the instruction comprises third data sent using a hypermedia representational state transfer (REST) interface and expressed using a JavaScript Object Notation (JSON) based on Open Data Protocol (OData).

* * * * *